(12) United States Patent
Bussler et al.

(10) Patent No.: US 7,401,336 B2
(45) Date of Patent: Jul. 15, 2008

(54) ROLE BASED INTEGRATED PLATFORM

(75) Inventors: Chris Bussler, Half Moon Bay, CA (US); Roger Bodamer, San Carlos, CA (US)

(73) Assignee: Oracle International Corporation, Redwood Shores, CA (US)

(*) Notice: Subject to any disclaimer, the term of this patent is extended or adjusted under 35 U.S.C. 154(b) by 720 days.

(21) Appl. No.: 10/441,425

(22) Filed: May 19, 2003

(65) Prior Publication Data

US 2003/0225920 A1    Dec. 4, 2003

Related U.S. Application Data

(60) Provisional application No. 60/385,020, filed on May 30, 2002.

(51) Int. Cl.
　　*G06F 3/00*　　(2006.01)
　　*G06F 9/44*　　(2006.01)
　　*G06F 9/46*　　(2006.01)
　　*G06F 13/00*　　(2006.01)

(52) U.S. Cl. .................. 719/313; 719/320; 709/246

(58) Field of Classification Search ............... 719/310, 719/313–320, 328–330; 709/230–231, 245–246, 709/201–203, 213–215, 217–218
See application file for complete search history.

(56) References Cited

U.S. PATENT DOCUMENTS

| | | | |
|---|---|---|---|
| 5,497,491 A | 3/1996 | Mitchell et al. | |
| 5,524,253 A | 6/1996 | Pham et al. | |
| 6,125,391 A | 9/2000 | Meltzer et al. | |
| 6,453,356 B1* | 9/2002 | Sheard et al. | 709/231 |
| 6,507,875 B1* | 1/2003 | Mellen-Garnett et al. | 719/310 |
| 6,738,975 B1 | 5/2004 | Yee et al. | |
| 7,065,588 B2 | 6/2006 | Konda et al. | |
| 7,146,614 B1 | 12/2006 | Nikols et al. | |
| 2002/0161907 A1* | 10/2002 | Moon | 709/230 |
| 2003/0033437 A1 | 2/2003 | Fischer et al. | |

\* cited by examiner

*Primary Examiner*—William Thomson
*Assistant Examiner*—Diem K Cao
(74) *Attorney, Agent, or Firm*—Hickman Palermo Truong & Becker LLP (57) ABSTRACT

A centralized integration system is provided for enabling two or more heterogeneous applications to exchange communications with one another. Metadata is stored in a first repository form in order to configure instructions for performing one or more conversion operations on a particular item that is to be exchanged between two or more heterogeneous applications. The first repository form may be structured so as to facilitate validation of the metadata prior to the metadata being used to configure instructions for configuring the instructions. Transmission of the particular item to the integration system is detected. In response to detecting the item, the metadata in the first repository form is converted into a second repository form. The second form is structured to facilitate execution of the configured instructions using the metadata. As a result of the instructions being executed, one or more conversion operations are performed to convert the particular item from a format of the first application to a format of each of the one or more other applications.

30 Claims, 4 Drawing Sheets

ROLE BASED INTEGRATED PLATFORM

RELATED APPLICATIONS

This application claims benefit of priority to Provisional U.S. Patent Application No. 60/385,020, entitled "Method and Apparatus for Exchanging Communications Between Heterogeneous Applications", naming Roger Bodamer and Chris Bussler as inventors, and filed May 30, 2002.

FIELD OF THE INVENTION

The present invention relates to database systems. In particular, the present invention relates to techniques for converting items for exchange between heterogeneous applications.

BACKGROUND OF THE INVENTION

Integration systems for enabling the exchange of items between heterogeneous applications exist. These systems typically enable two types of applications to exchange content or information. For example, a database application, a spreadsheet application and a word processing application may be integrated to communicate with one another.

One approach for enabling communication between heterogeneous applications is to implement a messaging scheme that allows the dissimilar applications to exchange data using messages. A message is a body of data that is formatted according to a particular format. An application may generate messages according to a particular format and then transmits the message to the other applications.

When all of the applications in communication with one another are developed by a single source, a single messaging scheme can be implemented across all of the applications so that each application is aware of all the other applications and knows how to communicate with them. However, when the applications are not all developed by a single source, some applications may not be able to communicate with other applications using messages because they do not support the same messaging scheme. Another problem is that some applications are not necessarily designed to communicate with other applications at all. Applications that are not designed to communicate with other applications through messages are not "message aware".

One approach for providing communication between applications that do not all support compatible communication formats and protocols, or that are not all message aware, is to update the source code of the applications to implement a single message scheme in all of the applications. With a single messaging scheme, each application knows which other applications it has to communicate with, the expected format of the messages, and the protocol that will govern the communication of the messages.

Unfortunately, the single messaging scheme is not practical in most situations where the applications can come from many sources. It is difficult to get even a small set of application sources to agree on a common messaging scheme. However, agreement is virtually impossible when the applications to be integrated may come from virtually any source of any form of software application.

Another approach for providing communication between applications that do not all support compatible communication formats or that are not all "message aware" involves the use of adapters. An adapter is essentially a translator that converts data in one format to produce data in another format. The data before and after the translation contains the same information. However, the format of the data is changed. For example, an adapter may convert a message in format A to produce a message in format B.

In addition to converting the message format, an adapter must be able to communicate with the application from which it is receiving messages, and to which it is providing converted messages. Consequently, the hard-coded logic of the adapter must take into account the protocols required by each.

An adapter may be integrated into its corresponding application or may be more loosely associated with its corresponding application. The adapter approach distributes the process of integrating applications with one another. When the application transmits or "publishes" a message to a target application, the adapter ensures that the published message is converted into the format expected by the target application so that the target application will be able to successfully read the message. When the target application sends a request to the publishing application, an adapter ensures that the request is in the format expected by the intended application so that the application will be able to successfully decipher the request.

Because all of the logic required for the integration is incorporated into a single component, the adapter, the expertise level required to design that component is significant. Specifically, the adapter designer must be intimately familiar with the protocols and formats used by all applications the adapter is designed to integrate. Further, such an expert is unlikely to be in a position to know, much less provide hard-coded logic to support, user-specific business rules.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for converting items for exchange between heterogeneous applications is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Definitions

The term "application" means a computer program of any type, or one or more software modules or components of a computer program.

A "repository" is a set of data, such as a database, stored on a storage medium.

The term "item" refers to any data structure created by an application. Examples of items include documents, such as spreadsheets, pages, coded pages, electronic purchase orders and confirmations, and portions thereof.

"Metadata" refers to information about data.

"Syntax" means the expression of content, instructions, and data values. For example, the syntax of a document may include the placement of content appearing on the document, as well as some usages of grammar.

The term "semantic" means the underlying meaning or result of a syntax expression.

As an illustrative example, a document converted from binary to Hypertext Markup Language (HTML) may undergo both syntax and semantic conversions. The syntax conversion may reorganize the content or data on the document. The semantic conversion may reorganize the content or data on the document. The syntactic conversion may replace the binary code with the HTML tags and the content. For values, the semantic form may correspond to the unit or basis for determining the value. As another example, a semantic conversion may correspond to changing the currency of a particular monetary value.

Functional Overview

Techniques and systems are described herein for enabling a plurality of heterogeneous applications to communicate with one another using a centralized integration platform. In particular, embodiments of the invention enable numerous types of applications and engines, operating under different protocols and/or having different formats, to exchange communications with one another.

Specifically, numerous distinct applications operating under distinct formats are able to exchange documents, messages, and other types of communications with one another. For example, business-to-business engines operating under different protocols or formats may conduct business transactions with one another across the integration system. Different types of network enabled applications may exchange information and messages across an integration system such as described herein. In addition, the range of applications that can be used with an application service provider (ASP) may be increased by interfacing the applications to the ASP through an integration system such as described. Other types of implementations for the integration system may be applicable.

Multi-Phase Item Exchange Operations

According to an embodiment, a centralized integration system is provided for enabling two or more heterogeneous applications to exchange communications with one another. Unlike the adapter approach to integration, embodiments described herein do not attempt to centralize all logic required to perform the integration of applications. Instead, the conversion required for the exchange of an item is performed in several distinct phases, where the expertise required to design the logic for each phase differs from the expertise required to design the logic for the other phases.

Figure 1:
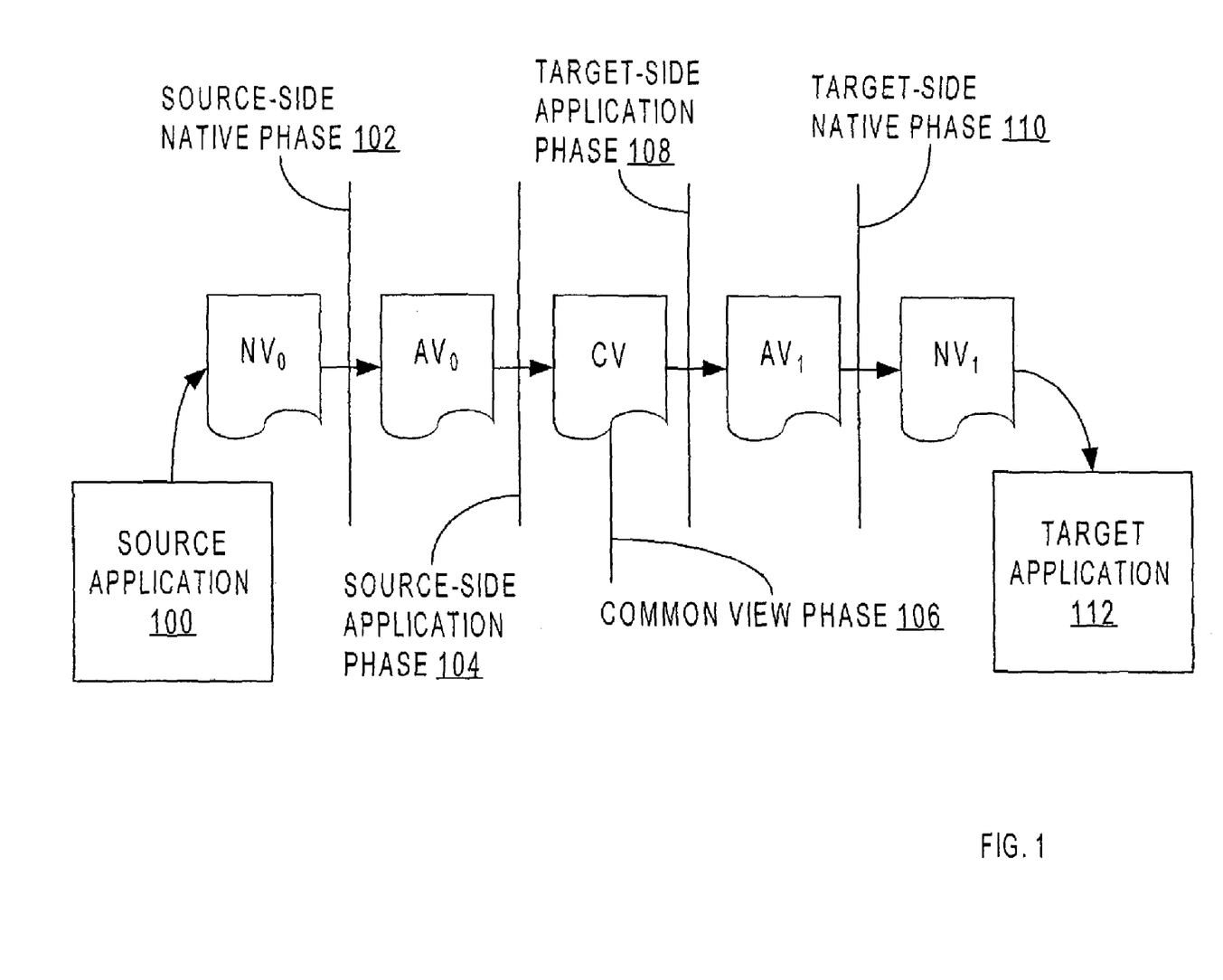
FIG. 1 is a block diagram various phases that occur during an exchange process for when an item is converted from a source application to a target application.

According to one embodiment, each item exchanged from a source application to a target application goes through five distinct processing phases, referred to herein as:
1) source-side native phase
2) source-side application phase
3) common view phase
4) target-side application phase
5) target-side native phase Referring to FIG. 1, it is a block diagram illustrating the various phases that occur during the exchange of an item from a source application 100 to a target application 112, and the forms to which the item is converted during the exchange process. Specifically, during the source-side native phase 102, the item is converted from a native form (NV0) provided by the source application to an application form (AV0) required by the source-side application phase 104. During the source-side application phase 104, the item is converted from AV0 to a common view form (CV). During the common view phase 106, user-specific business logic may be executed in response to the arrival of the item. During the execution of the business logic, the item may be modified, but the item generally stays in the common view form.

During the target-side application phase 108, the item is converted from CV to the application form (AV1) required by the target-side native phase 110. During the target-side native phase 110, the item is converted to the native form (NV1) expected by the target application 112, and provided to the target application 112. Each of these phases, and the type of conversions and operations that may be performed during them, shall be described in greater detail hereafter.

According to one embodiment, an integration system is provided that allows the workflow that is performed during each of these phases to be defined independently of the workflow performed during the other phases. Consequently, unlike the adaptor approach, no single individual needs have the expertise required to perform the entire item exchange operation. Rather, those who are experts in a particular area may be assigned to define the workflow required during the phase in which that particular expertise is required.

Roles

According to one embodiment, a separate "role" applies to each of the phases in the item exchange process. In this context, a "role" specifies the workflow of the operations to be performed during the phase with which the role is associated. For example, during the phases that involve communication with applications (e.g. the source-side native phase 102 and the target-side native phase 110), the role specifies the actions required to perform the communication, and the sequence in which the actions must occur.

According to one embodiment, a role specifies the workflow of operations to be performed during a phase by identifying a set of rules to apply during the phase. For example, the role for a source-side native phase 102 may specify a set of rules about how to interact with the source application 100 to receive the data item from the source application.

Because the actions that are required to perform the communication is dictated by the hard-coded behavior of the application involved in the communication, the designer of the role used during the source-side native phase 102 must have expertise in the behavior of the source application 100. Similarly, the designer of the role used during the target-side native phase 110 must have expertise in the behavior of the target application 112.

During the application phases 104 and 108, and the common view phase 106, application-specific expertise is not necessarily required. However, as shall be discussed hereafter, different expertise or knowledge, which may not be possessed by those that have the application-specific expertise, is required to design the roles that apply to phases 104, 106, and 108.

The Source-Side Native Phase

As mentioned above, the source-side native phase 102 is the phase during which the item is received from the source application 100. For the purpose of explanation, it shall be assumed that the item being exchanged from source application 100 to target application 112 is a purchase order. Thus, source application 100 is an application capable of producing a purchase order, and that target application 112 is an application capable of receiving a purchase order.

During the source-side native phase 102, the purchase order is received from the source application 100. The actual message interchange between the integration system and the source application 100 during this phase is dictated by the hard-coded logic of the source application 100, and may be quite complex. For example, receiving a purchase order from source application 100 may involve a series of requests, initializations, and acknowledgement messages to be exchanged between the integration system and the source application. The role that corresponds to the source-side native phase 102 specifies these operations, and the sequence in which they must be performed.

When the item is received from the source application 100, the item is in its native form (NV0). All aspects of the native form, including the syntax, semantics, encoding and arrangement of the content of the item, are dictated by the source application 100. Because the designer of the role associated with the source-side native phase 102 has expertise relative to the source application 100, that designer can be assumed to understand all aspects of the native form. On the other hand, the designers of the roles associated with the other phases are not expected to have such expertise. Consequently, another tasked performed by the role associated with the source-side native phase 102 is to convert the item from NV0 form to the application form (AV0) that can be understood by the designer of the role that governs the source-side application phase.

According to one embodiment, the NV0 to AV0 conversion involves changing the application-specific syntax of NV0 to an application-independent, or "common" syntax. For example, the NV0 form of a purchase order may be a binary file with proprietary encoding, while the AV0 form of the purchase order is an XML document in which tags have been placed around the individual data elements within the purchase order. In this example, the XML syntax is given as an example of a common syntax into which items may be converted during the source-side native phase. However, the invention is not limited to any particular form of common syntax. The AV0 syntax is referred to herein as "common" and "application-independent" because it is the syntax into which an item is placed during the source-side native phase 102 regardless of the source application 100 from which the item originated.

The Source-Side Application Phase

The source-side application phase receives the item in the AV0 form and converts the item to the common view form. According to one embodiment, the AV0-to-common-view conversion involves parsing the elements of the item, and rearranging the elements as needed for the item to conform to a canonical, application-independent format. Because the item was converted to a common syntax during the source-side native phase 102, an application-independent parser can be employed during the source-side application phase 104. For example, in embodiments that use the XML syntax as the common syntax, an XML parser may be used for all AV0-to-common-view conversions, without regard to the syntax used by the source application 100 from which the item originated.

After the conversion, the item will retain the common syntax, but the arrangement and semantics of the individual elements will have changed as necessary to conform with an established canonical format for that type of item. For example, during the conversion, the individual elements of the XML version of a purchase order may be rearranged as necessary to conform the purchase order to a particular XML schema.

The role designed for the source-side application phase 104 may specify various tasks to be performed during this phase, including the validation of values contained in the item. For example, assume that the purchase order has an order date. The source-side application phase role may specify the task of validating the order date value by checking that the order date is not older than one month prior to the current date. As mentioned above, a role may specify the tasks by identifying a set of rules to be applied during the phase to which the role corresponds. In the case of the source-side application phase role, those rules may include a variety of data validation rules.

The Common View Phase

The tasks performed prior to the common view phase 106 remove from the item all application-specific syntax, encoding, formatting and arrangement of content. Thus, when in CV form, all items of a particular type, such as purchase orders, reflect the same syntax, semantics and organization, regardless of the application from which they originated.

According to one embodiment, the operations performed during the common view phase are those operations that are to be performed on all items of a particular type, and therefore do not involve any application-specific knowledge. Such actions may, for example, be those actions dictated by a particular company's policies. Thus, the role associated with the common view phase 106 can be used to implement the "business rules" of a company. Such business rules may include, for example, sending an email to an office of the company when the amount of a purchase order exceeds some threshold value.

The expertise required to specify the business rules of a company is very different than the application-specific expertise required to convert an item from one form to another. Thus, significant benefit is derived by having the role associated with the common view phase 106 defined separately from and independently of any application-specific concerns.

The Target-Side Application Phase

Target-side application phase 108 generally performs the inverse of the source-side application phase 104. Specifically, while retaining the common syntax, the item is converted to reflect the semantics, organization and format expected by the target application 112. Similar to the role applied at the source-side application phase 104, the role applied at the target-side application phase may specify rules for data validation based on the needs of target application 112.

Target-Side Native Phase

The target-side native phase 110 generally performs the inverse of the source-side native phase 102. Specifically, during the target-side native phase 110 the item is converted to reflect the syntax required by the target application 112. The item produced by the target-site native phase 110 is provided to the target application 112, and therefore must conform to the application-specific format required thereby. Similar to the role associated with the source-side native phase 102, the role associated with the target-side native phase specifies the workflow required to interact with target application 112.

Enabling a Designated User to Interact with an Item when the Item is in an Intermediate Format In an embodiment, a designated user is enabled to interact with a particular item when the particular item is in one or more intermediate formats. The stored metadata may be used to identify the designated user associated with the particular item. Also, the designated user may view data from the particular item in at least one of the one or more intermediate formats.

When the particular item is in the one or more intermediate formats, the stored metadata may be used to identify the user that is designated as being able to alter data contained in the particular item. Also, the stored metadata may be used to identify the user that is designated as being able to perform one or more operations on the particular item when the particular item is in the one or more intermediate formats. Additionally, when the particular item is in the one or more intermediate formats, the stored metadata may be used to identify the user that is designated as being able to perform one or more operations using data contained in the particular item.

Single to Many Application Conversions

Embodiments of the invention enable an item to be transmitted from one source application to a plurality of target applications. Each of the target applications may be heterogeneous with respect to the other target applications and with respect to the source application. The establishment of a common view form for an item facilitates the conversion of an item from the native form of the source application to that of the target application.

An item designated for many target applications may be subjected to a source-side native phase and a source-side application phase for the source application, after which the item is in the common view form. The item may then be subjected to a common view phase. During the common view phase, the item may be copied for each of the target applications. In one embodiment, each of the items is sequentially subjected to the target-side application phase and the target-side native phase of the respective target application corresponding to that item. Since the semantics and syntax of each target application is different, the conversion operations performed during each phase may be distinct for each target application. Thus, each item may have a different target-side application form and native form.

When an item is being converted for multiple target applications, the roles applied during each target-side application phase and target-side native phase may also be configured specifically for the target application and/or its users. One or more roles may be executed at the common view phase before the item is subjected to the many target-side application phases.

System Overview

Figure 2:
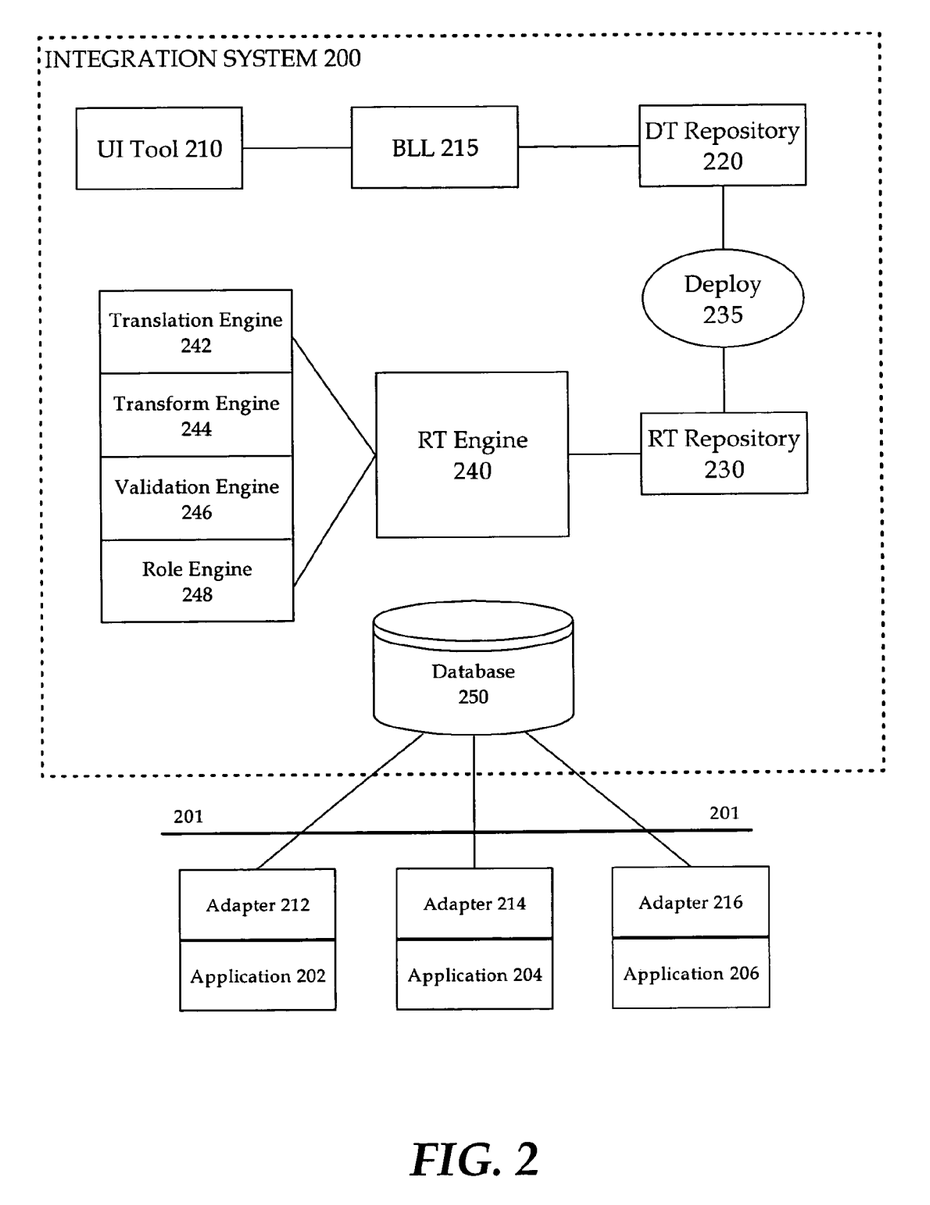
FIG. 2 of a centralized integration system for enabling a plurality of heterogeneous applications to exchange communications with one another.

A centralized integration system may be used to perform the multi-phase item exchange operations described above. FIG. 2 illustrates the architecture of an integration system according to one embodiment of the invention. While a particular system architecture is described, the actual architecture of a system used to perform the multi-phase item exchange may vary from implementation to implementation.

Referring to FIG. 2, an integration system 200 enables the exchange of communications between a plurality of applications 202, 204, 206 (APP1, APP2 . . . APPN). The applications 202, 204, 206 may communicate with integration system 200 across a network 201. For the purpose of illustration, it shall be assumed the applications 202, 204, 206 are heterogeneous in that each one of the applications may have a distinct format, a distinct behavior, and/or communicate using a distinct protocol. Examples of applications 202, 204, 206 that communicate with one another across integration system 200 include network enabled client applications, business-to-business exchanges, and ASP applications.

The integration system 200 includes a user-interface (UI) tool 210, a design-time repository 220, a runtime repository 230, a runtime engine 240, and a database 250. In one embodiment, runtime engine 240 accesses a translation engine 242, a transformation engine 244, a validation engine 246 and one or more role engines 248. The database 250 stores items sent from the applications 202, 204, 206 for the integration system 200. The integration system 200 accesses the items from the database 250 and records changes to the items as the items are converted from the forms of the source applications to the forms of the target applications. A business layer 215 provides an interface for certain users to view the status of items and "progress reports" of items being processed through the integration system 200.

Each of the application 202, 204, 206 may have a corresponding adapter 212, 214 and 216. Each adapter 212, 214 and 216 is configured specifically for its corresponding application. In one embodiment, the adapters 212, 214 and 216 write items from corresponding applications to database 250. Components of integration system 200 may use the item by accessing records in database 250 when processes of the integration system 200 are performed.

In one example, documents and files created through the use of first application 202 may have a first syntax and semantic format, but communicate through the integration platform 200 with other applications 204, 206 that have different syntax and/or semantic formats. According to one use of an embodiment, an item transmitted from first application 202 for delivery to the other applications 204, 206 is first received by integration system 200. The integration system 200 converts the item to one or more syntax and semantic formats of the other applications 204, 206. Once conversion of an item is complete, the integration system 200 forwards the item to the other applications. As explained above, the conversion of the item may be performed through several phases, including a phase during which the item is placed in a common view form from which all application-specific formatting has been removed.

Integration system 200 includes design-time components and runtime components. Design-time components are generally used to specify how the integration system 200 should function to allow items to be exchanged between heterogeneous applications. The runtime components, on the other hand, are the components involved in performing the specified operations during a multi-phase item exchange operation. The various components of system 200, and how such components interact to perform the multi-phase exchange of items among heterogeneous applications, shall be described in greater detail hereafter.

Design-Time Components

In an embodiment, users enter information to configure the operations of the integration system 200. Specifically, an embodiment provides that users enter information in the form of metadata. The metadata may be entered through a UI tool 210 and stored within design-time repository 220.

In one embodiment, the metadata is used to identify operations that are to be performed on an item based on factors such as the identification of the application sending the item, the identification of the application receiving the item, and the occurrence of an event caused by or otherwise associated by that item. In addition, the metadata enables the user to specify roles, in the form of sets of rules, that are to be executed as the item is passed through the integration system 200. Specifically, the metadata may specify translation and transformation operations, as well as the roles are to be executed as part of the distinct phases for each item. Other information that may be specified by the metadata include, for example, the manner in which a particular item is to be coordinated or tracked as it is subjected to various conversion operations and rules.

Once the metadata is stored in design-time repository 220, the metadata may be verified and/or checked before the metadata is in use. For example, the user may specify a recipient application or terminal for a particular item when that recipient is not available, or when the integration system 200 is not configured to perform operations for delivering the item to that recipient. The design-time repository may be configured to detect when the configurations requested by the user through metadata is incorrect. As a result, the occurrence of potential errors may be detected before the integration system 200 begins processing items being exchanged between applications.

The metadata is deployed to the runtime repository 230 after the metadata is verified in the design-time repository 220. In the runtime repository 230, the metadata is in a form that facilitates identification and execution of instructions from the various engines accessed by runtime engine 240. In one embodiment, the form of design-time repository 220 is primarily normalized, and the form of the runtime repository 230 is primarily denormalized. The denormalized form is redundant, and requires a significant larger amount of storage. But metadata in a denormalized form can be used by runtime engine 240 for the execution of instructions from the various engines with minimal intervening steps. Accordingly, storing metadata in the design-time form facilitates verification of the metadata. To preserve storage, a set of metadata required to identify and configure conversion operations for a particular item may be transferred from design-time repository 220 to runtime repository 230.

A deployment mechanism 235 may be used to deploy the normalized set of metadata from the design-time repository 220 to the runtime repository 230. The deployment mechanism 235 is configured to denormalize metadata being stored in design-time repository 220. The deployment mechanism 235 may correspond to a pre-programmed module or sub-application of runtime engine 240 or other integration system component that performs the specific task of converting metadata from the design-time form to the runtime form. In one embodiment, the deployment mechanism acts in response to the metadata being verified in the design-time repository 230. In another embodiment, the deployment mechanism 235 may operate responsive to external events, such as for example, by the detection of an item requiring a set of metadata to be deployed.

Runtime Components

The runtime engine 240 acts on items submitted by the different applications 202, 204, and 206. The item may be transferred from one of the applications 202, 204, 206 to database 250 in the native form of that application. The runtime engine 240 uses properties of the item to identify a set of metadata in the runtime repository 230 for that item. For example, the runtime engine 240 may use properties of the item such as its source application or source sender to identify a corresponding set of metadata in runtime repository 230. The runtime engine 240 uses the set of metadata stored to identify instructions for performing conversion operations. In one embodiment, the runtime engine 240 also uses the metadata to identify roles that are created for the item for each of its various phases. The metadata may also be used to identify instructions for performing operations such as validation.

During runtime, embodiments of the invention provide that an item is subject to a series of translation and transformation conversions during the various phases from which the item is converted from a native form of the source application to a native form of a target application. A role requiring the performance of one or more operations may be designated for an item during each of the phases.

Initially, the item is stored in the database in the native form of the source application. The runtime engine 240 uses the set of metadata to identify and execute instructions from the translation engine 242. Execution of the instructions from translation engine 242 may occur as part of the source-side native phase, during which the item is converted to an application form of the source application. In an embodiment, the runtime engine 240 also uses the set of metadata identified for that item to identify roles that are to be performed for the item during the source-side native phase. If a role is to be performed during that phase, then runtime engine 240 identifies and executes instructions from the role engine 248 for performing operations corresponding to that role. After the translation is performed, the item is stored in database 250 in its application form.

Next, the runtime engine 240 uses the set of metadata to identify and execute instructions from the transformation engine 244. Execution of the instructions from the transformation engine 244 may occur as part of the source-side application phase, during which the item is converted into the common view form. The metadata may also be used to execute instructions from role engine 248 to perform operations corresponding to a designated role for the item during the source-side application phase. In one embodiment, the role for the source-side application phase includes validation, and instructions for performing validation are retrieved from validation engine 246. After the source-side application phase, the item is stored in database 250 in its common view form.

The runtime engine 240 may access role engine 248 to perform roles for the item during the common view phase. From the common view, the runtime engine 240 uses the set of metadata to execute instructions from transformation engine 244. Execution of the instructions from the transformation engine 244 may occur as part of the target-side application phase. The set of metadata may also be used to execute instructions from role engine 248 to perform operations corresponding to a designated role for the item during the target-side application phase. After the instructions are executed, the item may be stored in database 250 in the application form of the target application.

Following the target-side application phase, runtime engine 240 uses the set of metadata to execute instructions from the translation engine 242. Execution of instructions from translation engine 242 may occur as part of the target-side native phase. The set of metadata is used to execute instructions from role engine 248 to perform operations corresponding to a designated role for the item during the target-side native phase. After the translation is performed, the item is stored in database 250 in the native form of the target application. In one embodiment, the item is then sent to the target application. In another embodiment, the target application reads the item from database 250 through its corresponding adapter.

The runtime engine 240 may use validation engine 246 to validate aspects of an item being processed by integration system 200. While an embodiment described above incorporates validation operations during the application phases, validation functions can be performed during other phases as well. In one embodiment, the validation engine 246 may provide rules to validate the content of an item being exchanged between the applications. For example, certain parameters, such as date fields or monetary amounts, may be designated in the validation engine as being invalid or insufficient.

Tracking Items Through the Exchange Operation

Figure 3:
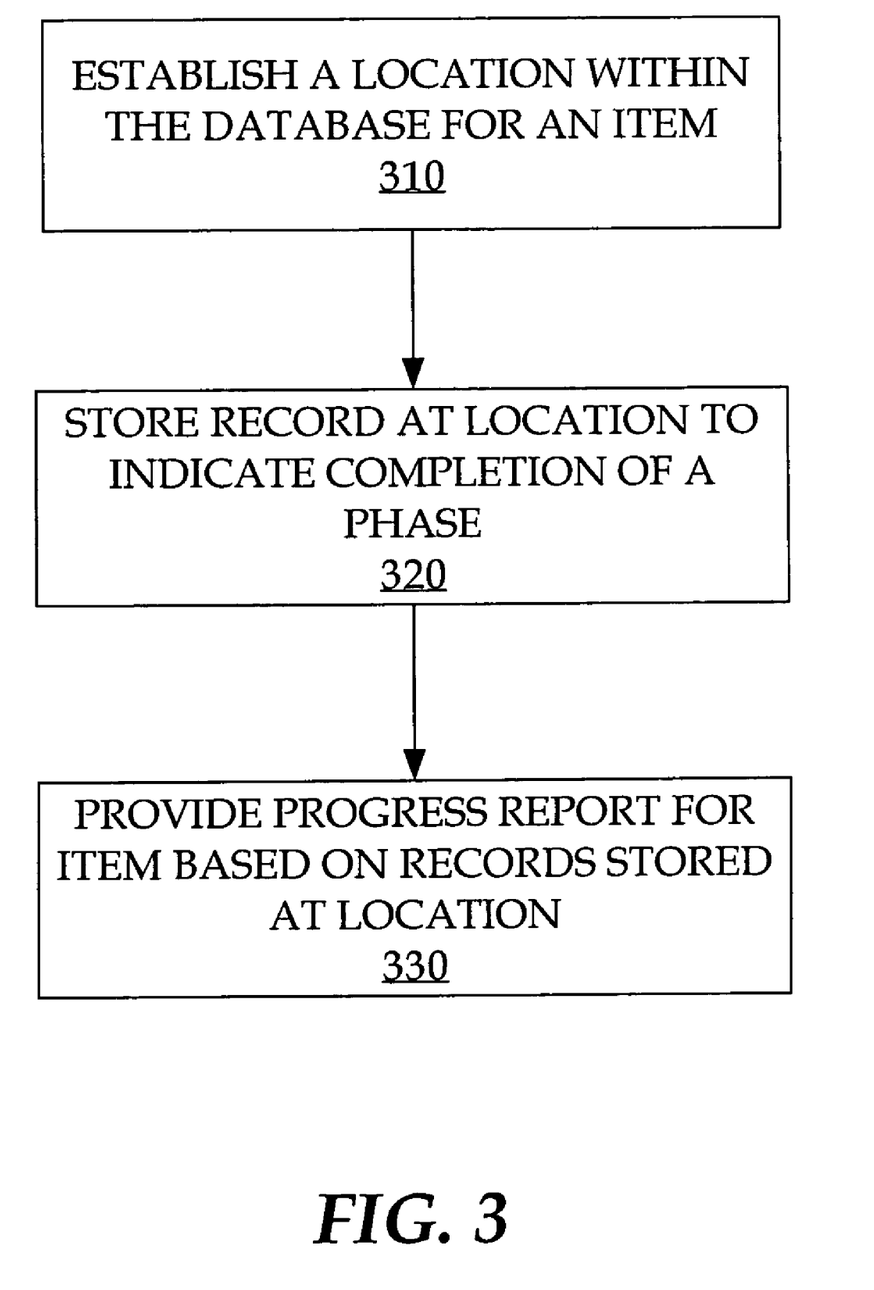
FIG. 3 illustrates a method for determining a status of an item being exchanged between two or more heterogeneous applications communicating through an integration system.

According to one embodiment, techniques are provided to facilitate the tracking of an item that is being exchanged between heterogeneous applications. FIG. 3 illustrates a method, according to one embodiment, to facilitate tracking of an item being converted for exchange between heterogeneous applications. Reference is made to elements of FIG. 2 for purpose of illustrating suitable components for performing steps of the method described with FIG. 3.

In step 310, at the start of the exchange operation a location within database 250 is established for an item sent from one of the applications 202, 204, 206. The item may be destined for another one of the applications, so that conversion to the different phases described with FIG. 1 is required.

Upon completion of each phase in the exchange operation, step 320 provides that a record is stored at the location established for that item in order to indicate that the phase has been completed for said item. Because all such "progress" records are stored at a known location, the progress of the exchange operation for that item may be easily ascertained at any time during the exchange operation by a user submitting to query that retrieves information from the specified location.

In one embodiment, the user may submit the query through the business layer 215. The user may be required to provide identification in order to make the query. In one embodiment, the identification may be verified and approved using the metadata stored for the particular item.

In step 330, a progress report is provided for the item based on the records stored at the location in database 250. The report may indicate the status of the item. In one embodiment, the status corresponds to which of the five phases described with FIG. 1 have been completed. The report may also provide a history of the different conversion operations performed on the item, including the completed phases. The report may be generated in response to a user request made through business layer 215. The report may also provide other information, such as what roles or other workflows or processes were performed for the item up to the point when the report was generated or updated.

Hardware Overview

Figure 4:
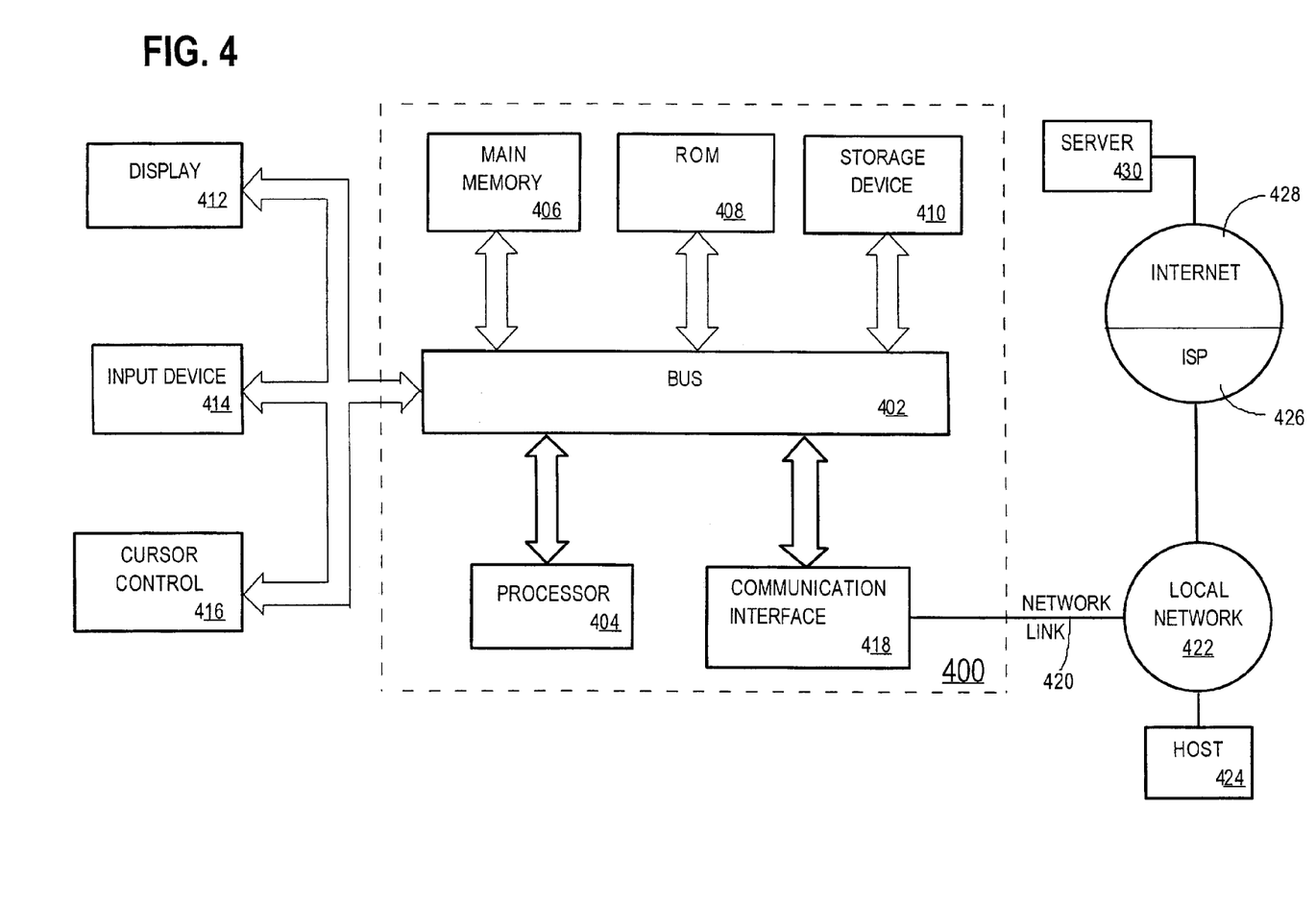
FIG. 4 is a block diagram that illustrates a computer system 400 upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave. In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for converting items for exchange between heterogeneous applications, the method comprising:
    storing metadata for performing one or more conversion operations on a particular item when the particular item is received from at least a first application in a plurality of applications;
    receiving the item transmitted from the first application for delivery to one or more other applications in the plurality of applications;
    in response to receiving the item, performing one or more conversion operations on the particular item to convert the particular item from a format of the first application to one or more intermediate formats and then to a format of each of the one or more other applications; and
    while the particular item is in at least one of the one or more intermediate formats, allowing a user to perform at least one of the following actions:
        (a) altering particular data contained in the particular item;
        (b) modifying the particular item; and
        (c) initiating one or more operations using the particular data contained in the particular item;
    wherein the at least one action is independent of converting the particular item from the format of the first application to the format of each of the one or more other applications;
    after the one or more conversion operations, delivering the particular item to the one or more other applications.

2. The method of claim 1, further comprising using the stored metadata to identify a designated user associated with the particular item, and enabling the designated user to view data from the particular item in at least one of the one or more intermediate formats.

3. The method of claim 1, further comprising using the stored metadata to identify the user that is designated as being able to alter the particular data contained in the particular item.

4. The method of claim 1, further comprising using the stored metadata to identify the user that is designated as being able to perform one or more operations on the particular item when the particular item is in the one or more intermediate formats.

5. The method of claim 1, further comprising using the stored metadata to identify the user that is designated as being able to perform one or more operations using the particular data contained in the particular item.

6. The method of claim 1, further comprising identifying a sequence of stored instructions that are to be executed automatically using data contained in the particular item when the particular item is in the one or more intermediate formats.

7. The method of claim 1, wherein performing one or more conversion operations on the particular item includes performing a first syntax operation to convert a syntax of the particular item, and performing a first semantic operation to semantically convert a semantic aspect of the particular item.

8. The method of claim 7, wherein allowing the user to perform at least one of said actions includes allowing the user to perform at least one of said actions in response to at least one of the first syntax operation or the first semantic operation being performed.

9. The method of claim 7, performing one or more conversion operations on the particular item includes performing one or more second syntax operations to convert a syntax of the particular item to a syntax of each of the one or more other applications, and performing one or more semantic operations to semantically convert a semantic form of the particular item to a semantic form of each of the one or more other applications.

10. The method of claim 9, wherein allowing the user to perform at least one of the action includes allowing the user to perform at least one of the actions in response to at least one of the one or more second syntax operations or the one or more second semantic operations being performed.

11. The method of claim 1, wherein storing metadata for performing one or more conversion operations includes storing metadata entered by one or more users for performing the one or more conversion operations.

12. The method of claim 1, wherein storing metadata for performing one or more conversion operations includes storing metadata entered by a user of the first application and a user of each of the one or more other applications for performing the one or more conversion operations.

13. The method of claim 1, wherein allowing the user to perform at least one of said actions includes allowing the user to alter the particular metadata contained in the particular item.

14. The method of claim 1, wherein allowing the user to perform at least one of said actions includes allowing the user to modify the particular item.

15. The method of claim 1, wherein allowing the user to perform at least one of said actions includes allowing the user to perform said one or more operations using the particular metadata contained in the particular item.

16. A computer-readable storage medium carrying one or more sequences of instructions for converting items for exchange between heterogeneous applications, wherein execution of the one or more sequences of instructions by one or more processors causes the one or more processors to perform the steps of:
storing metadata for performing one or more conversion operations on a particular item when the particular item is received from at least a first application in a plurality of applications;
receiving the item transmitted from the first application for delivery to one or more other applications in the plurality of applications;
in response to receiving the item, performing one or more conversion operations on the particular item to convert the particular item from a format of the first application to one or more intermediate formats and then to a format of each of the one or more other applications; and
while the particular item is in at least one of the one or more intermediate formats, allowing a user to perform at least one of the following actions:
(a) altering particular data contained in the particular item;
(b) modifying the particular item; and
(c) initiating one or more operations using the particular data contained in the particular item;
wherein the at least one action is independent of converting the particular item from the format of the first application to the format of each of the one or more other applications;
after the one or more conversion operations, delivering the particular item to the one or more other applications.

17. The computer-readable storage medium of claim 16, wherein execution of the one or more sequences of instructions by the one or more processors further causes the one or more processors to perform the steps of using the stored metadata to identify a designated user associated with the particular item, and enabling the designated user to view data from the particular item in at least one of the one or more intermediate formats.

18. The computer-readable storage medium of claim 16, wherein execution of the one or more sequences of instructions by the one or more processors further causes the one or more processors to perform the step of using the stored metadata to identify the user that is designated as being able to alter the particular data contained in the particular item.

19. The computer-readable storage medium of claim 16, wherein execution of the one or more sequences of instructions by the one or more processors causes the one or more processors to perform the steps of using the stored metadata to identify the user that is designated as being able to perform one or more operations on the particular item when the particular item is in the one or more intermediate formats.

20. The computer-readable storage medium of claim 16, wherein execution of the one or more sequences of instructions by the one or more processors further causes the one or more processors to perform the step of includes using the stored metadata to identify the user that is designated as being able to perform one or more operations using the particular data contained in the particular item.

21. The computer-readable storage medium of claim 16, wherein execution of the one or more sequences of instructions by the one or more processors further causes the one or more processors to perform the steps of includes identifying a sequence of stored instructions that are to be executed automatically using data contained in the particular item when the particular item is in the one or more intermediate formats.

22. The computer-readable storage medium of claim 16, wherein the step of performing one or more conversion operations on the particular item includes performing a first syntax operation to convert a syntax of the particular item, and performing a first semantic operation to semantically convert a semantic aspect of the particular item.

23. The computer-readable storage medium of claim 22, wherein the step of allowing the user to perform at least one of said actions includes allowing the user to perform at least one of said actions in response to at least one of the first syntax operation or the first semantic operation being performed.

24. The computer-readable storage medium of claim 22, wherein the step of performing one or more conversion operations on the particular item includes performing one or more second syntax operations to convert a syntax of the particular item to a syntax of each of the one or more other applications, and performing one or more semantic operations to semantically convert a semantic form of the particular item to a semantic form of each of the one or more other applications.

25. The computer-readable storage medium of claim 24, wherein the step of allowing the user to perform at least one of said actions includes allowing the user to perform at least one of said actions in response to at least one of the one or more second syntax operations or the one or more second semantic operations being performed.

26. The computer-readable storage medium of claim 16, wherein storing metadata for performing one or more conversion operations includes storing metadata entered by one or more users for performing the one or more conversion operations.

27. The computer-readable storage medium of claim 16, wherein storing metadata for performing one or more conversion operations includes storing metadata entered by a user of the first application and a user of each of the one or more other applications for performing the one or more conversion operations.

28. The computer-readable storage medium of claim 16, wherein allowing the user to perform at least one of said actions includes allowing the user to alter the particular metadata contained in the particular item.

29. The computer-readable storage medium of claim 16, wherein allowing the user to perform at least one of said actions includes allowing the user to modify the particular item.

30. The computer-readable storage medium of claim 16, wherein allowing the user to perform at least one of said actions includes allowing the user to perform said one or more operations using the particular metadata contained in the particular item.

* * * * *

UNITED STATES PATENT AND TRADEMARK OFFICE
CERTIFICATE OF CORRECTION

| | | |
|---|---|---|
| PATENT NO. | : 7,401,336 B2 | Page 1 of 1 |
| APPLICATION NO. | : 10/441425 | |
| DATED | : July 15, 2008 | |
| INVENTOR(S) | : Bussler et al. | |

It is certified that error appears in the above-identified patent and that said Letters Patent is hereby corrected as shown below:

Col. 16, line 20, after "of" delete "includes".

Col. 16, line 27, delete "steps" and insert -- step --, therefor.

Col. 16, line 27, after "of" delete "includes".

Signed and Sealed this

Sixteenth Day of March, 2010

David J. Kappos
*Director of the United States Patent and Trademark Office*